United States Patent

Tejera

[15] 3,675,492

[45] July 11, 1972

[54] MEASURING SYRINGE

[72] Inventor: Luis H. Tejera, Central Islip, N.Y.

[73] Assignee: Mallinckrodt Chemical Works, St. Louis, Mo.

[22] Filed: June 10, 1970

[21] Appl. No.: 45,133

[52] U.S. Cl. .......................................................... 73/425.6
[51] Int. Cl. .............................................................. G01n 1/14
[58] Field of Search ............... 73/425.4 R, 425.4 P, 425.6; 222/158, 386; 128/216, 218 PA, 218 C, 234–238

[56] References Cited

UNITED STATES PATENTS

| 1,747,523 | 2/1930 | McCormack | 73/425.6 |
| 2,530,909 | 11/1950 | Riggs | 128/234 |
| 2,869,541 | 1/1959 | Helmer | 128/218 |
| 3,506,164 | 4/1970 | Weichelbaum | 222/386 |
| 3,525,264 | 8/1970 | Nieglos et al. | 23/259 |

FOREIGN PATENTS OR APPLICATIONS

| 807,217 | 6/1951 | Germany | 128/218 C |

Primary Examiner—S. Clement Swisher
Attorney—Koenig, Senniger, Powers & Leavitt

[57] ABSTRACT

A measuring syringe having an elongated plastic body including a narrow elongated passage opening into one end of the body which removably receives a hollow disposable tip for drawing and expelling a liquid into the tip by means of an elongated piston slidable in the passage. A second enlarged passage in the upper body section which opens into the opposite end of the body slidably receives an actuating stem whose bottom is connected to the piston and whose top projects from the body and is provided with an apertured flange for finger operation. A predetermined quantity of liquid may be drawn and expelled; the quantity being measured by stop members projecting from the actuating stem to be engageable with a stop surface on the body in the second passage. During manufacture, the stem is formed with a plurality of stops spaced along its length and corresponding to different quantities of liquid to be measured. To accomodate the stop members, an elongated slot is formed through one side wall of the body which receives the stop members and also provides visibility thereto.

16 Claims, 7 Drawing Figures

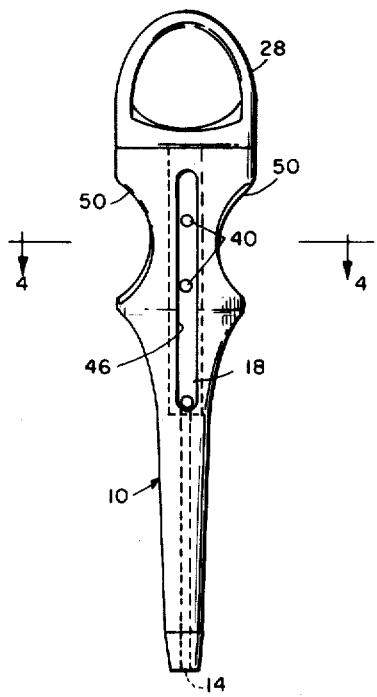
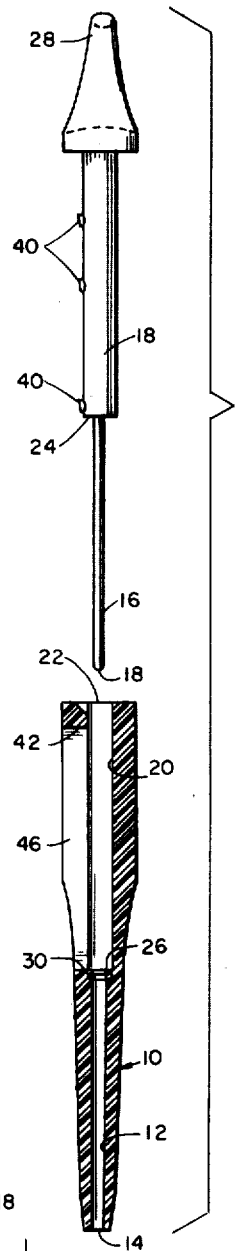
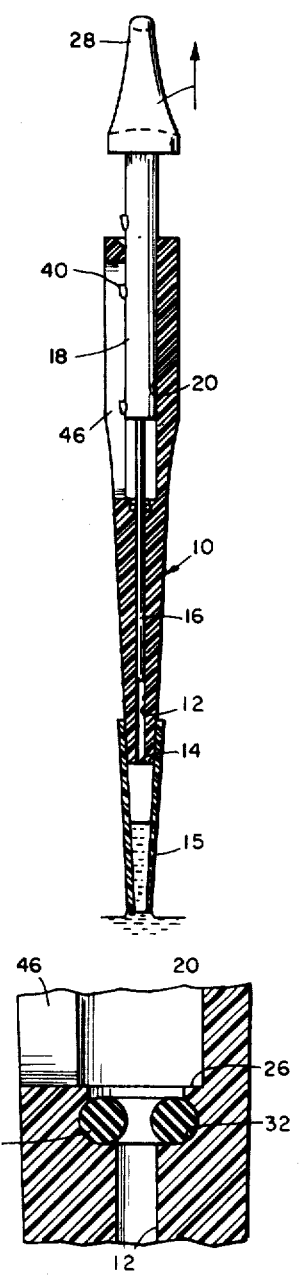
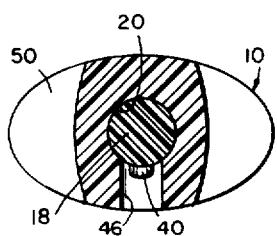
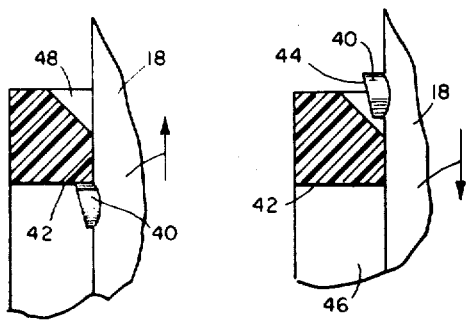
Fig. 1. Fig. 2. Fig. 3. Fig. 4. Fig. 5. Fig. 6a. Fig. 6b.
INVENTOR
LUIS H. TEJERA
BY
ATTORNEY

MEASURING SYRINGE

BACKGROUND OF THE INVENTION

This invention relates to a syringe and, more particularly, to a measuring syringe suitable for drawing and dispensing predetermined quantities of a liquid.

Many analytical laboratory procedures involve the obtaining and delivery of small, predetermined quantities of a fluid. For example, in preparing exact dilutions for hematologic and blood chemistry tests, it is extremely important that an accurate volume of blood or serum be transferred to the diluent fluid. In this respect various types of measuring pipettes have been proposed for use in such applications. In general, simple stem pipettes, calibrated to a mark, have been most popular, due probably to disadvantages inherent in the other types not the least of which is expense. The degree of precision and reproducibility obtained with stem pipettes, however, is severely hampered by unavoidable slight variations inherent when attempting to draw fluid samples visually to a mark.

The various blood analysis procedures of a typical test series require different precise quantities of serum or other reagents. In response to this need (as well as the desire to eliminate the disadvantages of stem pipettes) attempts have been made to develop a single measuring syringe which is mechanically adjustable to obtain and discharge different amounts of fluid. Such devices are generally complex as they employ mechanisms such as springs, gears, and movable set-screws to effect capacity changes. The relative expense of such devices leads to problems of maintenance and cleaning since disposal is impractical. Also, mechanisms of even slight complexity have a marked tendancy for fouling as caused by either mechanical failure or operator error.

Accordingly, it is an object of the present invention to provide an inexpensive accurate measuring syringe which may be quickly and easily operated and which is of compact construction.

SUMMARY OF THE INVENTION

The present invention is directed to a measuring syringe having an elongated plastic body including a very narrow elongated passage extending in the lower section thereof and opening into one end of the body for drawing and expelling a liquid into a hollow disposable tip received on said one end of the body. Slidable in the passage is an elongated needle-like piston which is actuated by means of a stem slidable in a second passage extending coaxially with the first passage in the upper section of the body and opening into the opposite end thereof. Both passages are generally cylindrical; however, the stem-receiving passage has a larger diameter and terminates in a shoulder situated at the upper end of the piston passage. To insure that the body passages are sealed from each other at all times an annular sealing ring is seated in a recess in the body between the piston and stem passages for sealingly receiving and engaging the piston.

The valve actuating stem is manipulated for operating the syringe by means of an apertured flange formed on the top of the stem externally of the body. In the lowermost position of the stem and piston the apertured flange rests on the top end of the syringe body. To further facilitate manipulation of the syringe in operation, a pair of concave surfaces are formed in opposite side walls of the body just below the upper end thereof.

Predetermined quantities of liquid may be drawn into and expelled from the syringe by employing one or more stop members formed on the stem as indicators of the various predetermined quantities. The stop members which, in one embodiment, are three in number, project laterally from the stem at spaced locations along the same side thereof so as to be engageable with a stop surface formed on the body adjacent to the stem passage at the upper end of the body. Upon movement of the stem through the body during use of the syringe, as a selected stop member engages the fixed stop surface on the body, the user will know that the desired predetermined quantity has either been withdrawn or expelled.

To facilitate movement of the stop members in the stem passage, the body is provided with an elongated slot extending generally coextensively with the stem passage for receiving the stop members. In the specific embodiment, this slot extends laterally completely through the side wall of the body so as to provide visible access to the stop members.

Other objects and advantages of the present invention will become readily apparent from the following more detailed description taken in conjunction with the accompanying drawings.

BRIEF DESCRIPTION OF THE DRAWINGS

FIG. 1 is a side elevational view of a syringe embodying the present invention.

FIG. 2 is an end view of the syringe shown in FIG. 1 however with the two parts thereof removed from each other and with one of the parts shown in cross section.

FIG. 3 is a view similar to FIG. 2 however with the parts in assembled relationship and with a removable tip employed during use of the syringe.

FIG. 4 is an enlarged cross sectional view taken generally along lines 4—4 of FIG. 1.

FIG. 5 is an enlarged detailed view of a portion of the syringe shown in FIG. 2.

FIGS. 6a and 6b are enlarged, fragmental cross sectional views illustrating a stop feature incorporated in the syringe.

DESCRIPTION OF THE PREFERRED EMBODIMENTS

Referring now to the drawings in detail, there is shown a measuring syringe embodying the invention and including an elongated body generally designated 10 which may be formed from any suitable plastic material which is inert to the liquid to be handled. Body 10 has an elongated very narrow cylindrical passage 12 extending throughout the lower half section thereof and opening into a nozzle 14 at the lower end of body 10 adapted to removably receive a hollow conical disposable tip 15. Passage 12 is employed to draw liquid into tip 15 (FIG. 3) and subsequently expel it by means of a plunger or piston 16 slidably received in passage 12.

Piston 16 is needle-like, being extremely narrow in cross dimension, and having a length generally equal to the length of passage 12 while also having a cylindrical shape terminating in a rounded tip 18 at the lower extremity thereof. The diameter of piston 16 in relation to that of the piston passage 12 is such that it has a sliding sealing fit therein so so as to create a suction or vacuum in passage 12 when fully inserted in passage 12 for purposes of subsequently lifting or drawing liquid into tip 15 upon withdrawal of the piston in the well known manner. Piston 16 may be made from the same plastic material as body 10.

Manual actuation of piston 16 for drawing or dispensing a liquid is achieved through an actuating stem 18 which is slidably received in a second passage 20 in the body formed coaxially with piston passage 12 in the upper section of the body and opening into the top of the body at 22. Actuating-stem passage 20 has a generally cylindrical cross-section, being larger than piston passage 12; the actuating stem 18 also being larger than piston 16 so as to be guided by the internal side walls of passage 20 during actuation. The lower end of actuating stem 18 is connected to the upper end of piston 16, with the surface 24 on the bottom of the actuating stem around the piston 16 forming a shoulder which abuts against an internal shoulder 26 formed in the body between the upper and lower passages 20 and 12, when the actuating stem is in its lowermost position in the body.

Finger manipulation of the operating stem for operating the syringe is obtained by an enlarged apertured flange 28 formed on the top of actuating stem 18 to comfortably receive the finger of the user. The bottom surface of flange 28 is elliptical in shape to correspond with the shape of the top surface 21 of the body on which the flange rests when the stem and piston are fully inserted in the body. The actuating stem may also be made from a suitable plastic and with an integral construction.

To insure that the piston passage 12 and the stem passage 20 are sealed from each other, an annular sealing ring 30 of any suitable material is provided in the body to sealingly engage piston 16. For this reason, the internal diameter of sealing ring 30 is less than the diameter of piston 16 to insure a good seal. In the specific form illustrated, sealing ring 30 is placed in a recess 32 in the body just above the top end of piston passage 12 and below shoulder 26 in the body. The curvature of recess 32 conforms to that of sealing ring 30 to insure proper seating of the sealing ring.

In order to permit drawing and dispensing predetermined amounts of liquid, actuating stem 18 is manufactured with a plurality of stops 40 projecting laterally from the stem at axially spaced locations preferably on the same side thereof, to be engageable with a fixed stop surface 42 formed in stem passage 20 at the upper end thereof. Depending on the specific liquid desired to be handled, two of the stops can be removed, if desired, preferably during manufacture of the syringe, thus leaving one stop corresponding to the desired quantity of liquid to be handled. Subsequently as the stem is fully inserted in the body, the desired predetermined quantity of liquid will be dispensed from tip 15. In one specific manufacture, three stops 40 are spaced along actuating stem 18 so as to be able to dispense amounts such as 0.1, 0.5, and 0.02 ml as desired. Because stops 40 are slightly resilient due to their plastic construction, they will pass the stop surface 42 upon insertion of the stem into the body. However, to minimize friction and facilitate insertion of actuating stem 18 into the body, stops 40 are formed with a downwardly and inwardly inclined surface 44 as shown in FIG. 6.

Movement of stops 40 in the body is permitted by an elongated slot 46 formed in one side wall of the upper body section for receiving and accomodating stops 40 throughout their movement in the body. In the specific embodiment illustrated, the fixed stop surface 42 is formed by the upper edge of elongated slot 46. To further reduce friction, the upper portion of stem passage 20 adjacent end 22 may be enlarged such as indicated at 48 (FIG. 6) for receiving the stops before they pass fixed body stop 42 during movement of the stem into the body. Inasmuch as elongated slot 46 extends entirely through the body sidewall, it also provides visibility to the stops 40.

In the preferred embodiment shown, about three-quarters of the length of the body has a conical external shape tapering towards the nozzle end 14 which moreover is formed with a reduced external dimension as illustrated. The upper section of body 10 has a generally elliptical curvature, except for two opposite concave recesses 50 which are formed to accomodate the fingers of the user.

In the above description, the syringe can be employed with only a single stop 40 for measuring a single quantity of liquid, the other stops having been removed after selection of a desired quantity of liquid. Applicant wishes it understood, though, that the other stops need not be removed and that the same syringe may be employed to handle any one of a plurality of predetermined quantities of liquids. In this latter instance, the lateral dimensions of stops 40 are chosen to permit them to be snapped past stop surface 42 upon withdrawal of the actuating stem. Moreover, although three stops 40 have been shown and described, a greater or lessor number may be employed. Also, although the syringe has been described above for use in conjunction with a disposable tip 15, the invention may also be utilized without such a tip.

It will be understood that in using the syringe, the stem 18 is pulled out to the limit determined by engagement of the stop 40 in slot 46 farthest from shoulder 26 (the middle stop of the three shown in FIGS. 1 and 3) with the end at 42 of the slot 46 for an intake stroke of the plunger or piston 16 thereby to prime the passage 12 (including the tip 15 if the latter is used) with a measured quantity of liquid as determined by the intake stroke. Then, the stem is pushed in for a discharge stroke of the plunger or piston 16 to the limit determined by engagement of the inner end 24 of the stem with the shoulder 26.

What is claimed is:

1. A measuring syringe comprising: a body having a first, narrow, elongated passage in one end thereof extending longitudinally of the body, a second passage extending longitudinally in the body above said first passage and having a greater width than said first passage; a piston assembly including an elongated narrow piston slidably received in said first passage for drawing and expelling liquid, an actuating stem connected to said piston at one end and slidably received in said second passage for operating the piston upon longitudinal movement of the stem; stop means in said body at a particular position along said second passage; and a plurality of stop members projecting laterally from the stem at locations spaced axially along the stem to be successively engageable with said stop means upon withdrawal of the stem to measure the amount of liquid drawn into said first passage whereby predetermined amounts of liquid may be drawn and subsequently expelled from said first passage, the stop means and the stop member being constructed relative to each other to provide for an insertion of the piston into the body in one direction to obtain a movement of the stop members past the stop means and to inhibit the withdrawal of the stop members past the stop means in the other direction, and wherein said body has an elongated slot in one sidewall thereof communicating with said second passage and extending to said stop means to provide for the passage of said stop members along said body.

2. A syringe as defined by claim 1 wherein said stop members are located in substantially aligned relationship on the same side of said stop.

3. A measuring syringe comprising in combination: a body having a first, narrow elongated passage in one end thereof extending longitudinally of the body, a second passage extending longitudinally in the body in alignment above said first passage and having a greater cross-dimension than said first passage; a piston assembly including an elongated narrow piston slidably received in said first passage for drawing and expelling liquid, an actuating stem extending longitudinally from said piston at one end and slidably received in said second passage for operating the piston upon longitudinal movement of said stem, said actuating stem being dimensioned to be slidably engageable with internal surface portions of said body to be guided thereby during sliding movement of the actuating stem in the body; stop means formed in said body at a particular position along said second passage; and a stop member projecting laterally from the stem to be engageable with said stop means upon withdrawal of the stem longitudinally along the second passage to inhibit further withdrawal of said stem and to provide for a predetermined amount of said liquid to be drawn and expelled with the use of the syringe, and wherein said body has a longitudinally extending elongated slot in a wall of said second passage for receiving said stop member and for providing for a movement of said stem longitudinally along said passage.

4. A syringe as defined by claim 3 wherein said body has the stop means in communication with said slot and wherein said stop means is constructed to provide for a longitudinal insertion of said stem into said body to obtain the movement of said stop members past said stop means and to inhibit the longitudinal withdrawal of said stem from said body to a position where the stop member would be withdrawn past said stop means.

5. A syringe as defined by claim 4 wherein said actuating stem projects from the outer end of said body and has an apertured flange fixed to the outer end thereof and adapted to engage on said other end of the body when the stem is fully inserted in the body.

6. A syringe as defined by claim 5 wherein said body has an upper portion surrounding a portion of said second passage and having a generally elliptical transverse curvature in the periphery thereof, said body portion also having in the opposite ends thereof external concave recesses for accomodating the fingers of an operator.

7. A syringe as defined by claim 6 wherein said body has a second portion surrounding said first passage and having a generally conical cross-section which converges from said upper portion towards said one end of the body.

8. A syringe as defined by claim 4 wherein said stop member is formed from a resilient material to facilitate the longitudinal movement of the stop member past said stop means during insertion of the stem into the body.

9. A syringe as defined by claim 4 wherein said piston and stem including said stop member are integral with each other and formed from plastic material.

10. A syringe as defined by claim 4 wherein said stop means is formed at the upper edge of said elongated slot.

11. A syringe as set forth in claim 4 wherein the second passage in the body is enlarged at the end thereof away from the first passage.

12. A measuring syringe comprising in combination: a body having a first, narrow, elongated passage in one end thereof extending longitudinally of the body, a second passage extending longitudinally in the body in alignment above said first passage and having a greater cross-dimension than said first passage; a piston assembly including an elongated narrow piston slidably received in said first passage for drawing and expelling liquid, an actuating stem connected to said piston and slidably received in said second passage for operating the piston upon longitudinal movement of said stem, said actuating stem being dimensioned to be slidably engageable with internal surface portions of said body to be guided thereby during sliding movement of the actuating stem in the body; stop means formed in said body adjacent said second passage; and a stop member projecting laterally from the stem to be engageable with said stop means upon withdrawal of the stem to measure a predetermined amount of said liquid to be drawn and expelled with the use of the syringe, said actuating stem projecting from the outer end of said body and having an apertured flange fixed to the outer end thereof and adapted to engage on said other end of the body when the stem is fully inserted in the body, said stop member being formed from a resilient material to enable the stop member to pass said stop mean during assembly, said stop member having an inclined outer surface slanting inwardly toward the piston end of the stem.

13. A measuring syringe comprising: a body having a first, narrow, elongated passage in one end thereof extending longitudinally of the body, a second passage extending longitudinally in the body above said first passage; a piston assembly including an elongated narrow piston slidably received in said first passage for drawing and expelling liquid, an actuating stem connected to said piston and slidably received in said second passage for operating the piston upon longitudinal movement of the stem; stop means in said body adjacent said second passage; and a plurality of stop members projecting laterally from the stem at locations spaced axially along the stem to be successively engageable with said stop means upon withdrawal of the stem to measure the amount of liquid drawn into said first passage whereby predetermined amounts of liquid may be drawn and subsequently expelled from said first passage, said stop members made from resilient material to enable the stop members to pass said stop means, and said stop members having outer surfaces inclined inwardly towards the piston end of the stem.

14. A measuring syringe comprising an elongate body having a first longitudinal passage extending inwardly from one end thereof and a second longitudinal passage of larger cross section than the first passage in line with the first passage and extending from the inner end of the first passage through the body to its other end with a shoulder at the inner end of the second passage around the inner end of the first passage, said body having a longitudinal slot in one side thereof opening into said second longitudinal passage, an elongate actuating stem having a sliding fit in the second passage extending out of said other end of said body and having means at its outer end enabling it to be manually pulled out, a plunger extending from the inner end of said stem through the first passage and having a sliding sealing fit therein, said stem having an integral stop projecting laterally outwardly into said slot, the stem being adapted to be pulled out to the limit determined by engagement of the stop with the end of the slot toward said other end of the body for an intake stroke of said plunger thereby to prime said first passage with a measured quantity of liquid, and then pushed in for a discharge stroke of the plunger to the limit determined by engagement of the inner end of the stem with said shoulder.

15. A measuring syringe as set forth in claim 14 wherein said stem is formed with a plurality of integral stops spaced at intervals along its length, each of the stops being adapted to be snapped past said other end of the body.

16. A measuring syringe comprising: a body having a first, narrow, elongated passage in one end thereof extending longitudinally of the body, a second passage extending longitudinally in the body above said first passage and having a greater width than said first passage; a piston assembly including an elongated narrow piston slidably received in said first passage for drawing and expelling liquid, an actuating stem connected to said piston at one end and slidably received in said second passage for operating the piston upon longitudinal movement of the stem; stop means in said body at a particular position along said second passage; and a plurality of stop members projecting laterally from the stem at locations spaced axially along the stem to be successively engageable with said stop means upon withdrawal of the stem to measure the amount of liquid drawn into said first passage whereby predetermined amounts of liquid may be drawn and subsequently expelled from said first passage, the stop means and the stop member being constructed relative to each other to provide for an insertion of the piston into the body in one direction to obtain a movement of the stop members past the stop means and to inhibit the withdrawal of the stop members past the stop means in the other direction, and wherein said body has an elongated slot in one sidewall thereof communicating with said second passage and extending to said stop means to provide for the passage of said stop members along said body, and wherein said stop members are located in substantially aligned relationship on the same side of said stop, and wherein the second passage in the body is enlarged at the end thereof away from the first passage.

* * * * *